March 19, 1940.    G. E. LINDEMANN    2,194,091
RECORDING INSTRUMENT
Filed Jan. 31, 1938
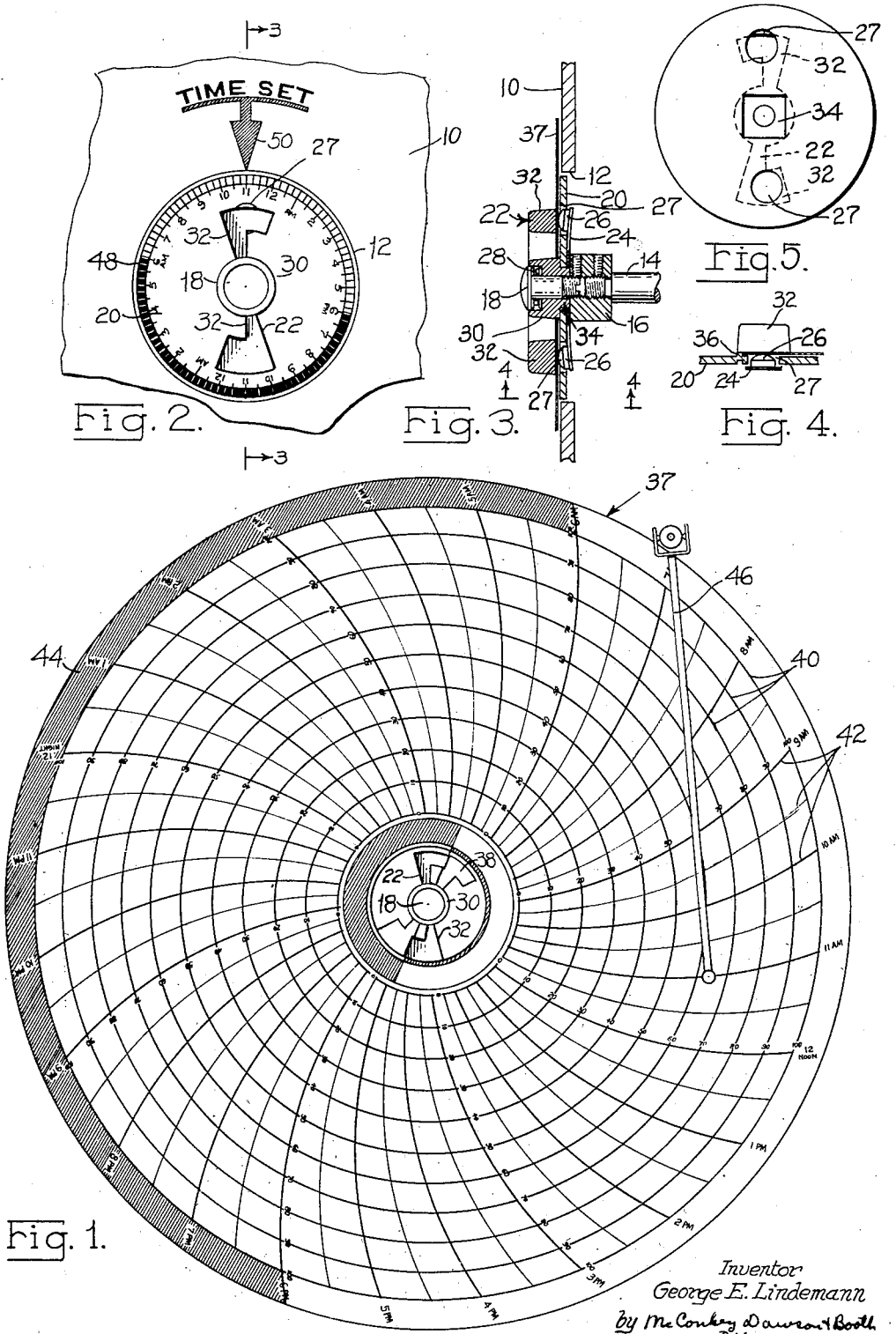
Inventor
George E. Lindemann
by McConkey Dawson & Booth
Attorneys Patented Mar. 19, 1940

2,194,091

UNITED STATES PATENT OFFICE 2,194,091

RECORDING INSTRUMENT

George E. Lindemann, Chicago, Ill., assignor to Republic Flow Meters Company, Chicago, Ill., a corporation of Illinois Application January 31, 1938, Serial No. 187,858

5 Claims. (Cl. 234—75)

This invention relates to recording instruments and more particularly to instruments in which a record is made on a rotating disc type chart.

In instruments of this type difficulty has been encountered in attaching a chart in proper timed position due partially, at least, to the difficulty of adjusting the chart while reading the time from the pen. This operation is also quite apt to result in smudging or undesired marking of the chart.

It is accordingly one of the objects of the present invention to provide a recording instrument in which a chart can be attached quickly and easily in proper timed position.

It is another object of the invention to provide a recording instrument in which the chart holding means may first be set and a chart may then be attached in timed relationship thereto. According to an important feature the chart holding means is constructed to secure a chart in timed position and is provided with indicia to indicate its time setting.

Other objects, advantages and novel features of the invention will be apparent from the following description when read in connection with the accompanying drawing, in which:

Fig. 1 is a partial plan view of an instrument embodying the invention;

Fig. 2 is a partial view similar to Fig. 1 with the chart removed;

Fig. 3 is a section on the line 3—3 of Fig. 2 with parts in elevation;

Fig. 4 is a partial section on the line 4—4 of Fig. 3; and

Figure 5 is a bottom view of certain parts of the chart holding mechanism.

The illustrated instrument comprises a chart supporting panel 10 having a central opening 12 through which a driving post 14 extends.

The post 14 may be connected to any suitable clock mechanism for turning the post at a predetermined timed rate, for example one revolution in twenty-four hours. One end of the post 14 is threaded into a collar 16 and may be locked in place by a suitable set screw. A headed screw 18 is threaded into the opposite end of the collar 16 and is similarly locked in place by a set screw. Thus a rigid connection adjustable longitudinally is provided between the post 14 and the screw 18.

A chart is adapted to be secured to the instrument by chart holding means on the post 14 comprising a disk 20 and a cap 22. The disk 20 is formed with a non-circular opening which loosely surrounds the shank of screw 18 and the cap 22 has a central cylindrical hub portion 30 which is rotatably mounted on the screw 18. The cap 22 and screw 18 are frictionally drivably connected by a friction clutch 28 and the cap is formed with a non-circular boss 34 fitting into the similarly shaped opening in the disk 20. In this way the cap and disk are prevented from relative rotation but may turn as a unit around the screw 18.

Between the disk 20 and the upper face of the collar 16 a leaf spring 24 is clamped. The leaf spring has a central opening fitting around the boss 34 and outwardly extending spring arms which carry buttons 26 at their ends. The buttons 26 project through openings 27 in the disk 20 and engage the lower surfaces of L shaped arms 32 on the cap 22 to press a chart against the arms. Beneath the ends of arms 32 the disk 20 is formed with pressed out timing projections 36 extending into engagement with the opposing surfaces of the arms.

As shown the cap 22 is shaped in plan substantially as shown in the patent to Spitzglass and Handwerk No. 2,152,333 and may be formed of a moulding, die casting or the like.

A chart 37 for use with the instrument is illustrated in Fig. 1 as being formed of a flat disk of paper or the like having a center opening 38 corresponding in shape to the shape of the cap 22. Outwardly of the center opening, the chart is printed with a series of concentric circles 40 graduated in terms of temperature, pressure, rate of flow or other condition to be recorded and with a series of arcuate time lines 42 struck about a center lying outside of the periphery of the chart. It will be noted that the chart is shaded at 44 to indicate recordings made at night and that the size of the L shaped portions 32 of the cap together with the correspondingly shaped chart opening 38 prevents the chart from being placed on the instrument in a reversed position. A record is made on the chart by a suitable pen 46 pivotally mounted on the instrument at a point concentric with the center of the arcuate time lines 42.

In placing a chart on the instrument, the center opening 38 is slipped over the cap 22 and the chart is turned to force its edge between the cap 22 and the disk 20 and between the cap 22 and the buttons 26 so that the spring 24 acting on the buttons 26 will press the chart against the underside of the cap. The chart may be turned readily until the radial edges of the openings 38 strike the projections 36 at which time further turning of the chart will be prevented and it will occupy a timed relation with the disk 20.

Since the chart and the disk 20 always occupy the same relative radial position, it will be apparent that the chart can be properly timed by timing the disk 20 before placing a chart thereon.

According to the present invention this is effected by graduating the periphery of the disk as indicated at 48 in time markings corresponding to the arcuate time lines 42 on the chart. A reference pointer 50 is provided on the panel 10 cooperating with the graduations 48 to indicate thereon the position at which the pen will mark the chart. As shown in Figs. 2 and 3, when the disk 20 is set so that pointer 50 indicates 11 A. M. on the graduations 48, the pen 46 will engage the chart on the arcuate time line 42 corresponding to 11 A. M. Thus to set the chart, an operator need only grasp the cap 22 and turn the disk 20 until the pointer 50 indicates on the graduations 48 the exact time of day. Thereafter, when a chart is placed on the instrument, it will necessarily occupy a position in which pen 46 engages the chart on the proper time line.

While one embodiment of the invention has been shown and described in detail, it will be apparent that many changes might be made therein and it is not intended to limit the scope of the invention to the exact form shown or otherwise than by the terms of the appended claims:

What is claimed is:

1. A recording instrument comprising a chart supporting panel having an opening therein, a chart post extending through said opening, chart holding means mounted on said post and including a part engageable with a chart to secure the chart in timed relationship to the chart holding means, means frictionally drivably connecting the chart post and the holding means, the panel and chart holding means having thereon cooperating indicia to indicate the time position of a chart on the instrument.

2. A recording instrument comprising a chart driving post having chart holding means thereon, means frictionally drivably connecting the chart post and the holding means, said chart holding means including a part engageable with a chart to secure it to the chart holding means in timed relationship therewith, and cooperating indicia on the chart holding means and on a relatively stationary part of the instrument to indicate the time position of the chart holding means and of a chart held thereby relative to the stationary part of the instrument.

3. A recording instrument comprising a chart driving post, a chart supporting disc mounted on said post, a cap mounted on the post and spaced from the face of the disc, means frictionally drivably connecting the chart post and the cap, means on the disc and cap securing them against relative rotation and means on the disc forming a timing projection for engagement with a timing edge on a chart, the disc having thereon time indicia for cooperation with indicia on a stationary part of the instrument to indicate the time position of the disc.

4. For use with a chart formed of a flat disc of paper or the like having a central opening with an offset portion providing a substantially radial timing edge and having on its face a series of arcuate time lines, a recording instrument comprising a chart supporting panel having an opening therein, a driving post extending through said panel opening, a disc carried by said post in the plane of the panel and having its periphery graduated to correspond to the time lines on the chart, a cap mounted on said post and spaced from the disc, means frictionally drivably connecting the post and the cap, means on the cap and the disc to prevent relative rotation thereof and means on the disc providing a timing projection for engagement with the timing edge on the chart to secure the chart to the disc in timed position thereon, and reference means on the panel cooperating with the graduations on the disc to indicate the time position of the disc and the chart.

5. For use with a chart formed of a flat disc of paper or the like having a central opening with an offset portion providing a substantially radial timing edge and having on its face a series of arcuate time lines, a recording instrument comprising a chart supporting panel having an opening therein, a driving post extending through said panel opening, a disc carried by said post in the plane of the panel and having its periphery graduated to correspond to the time lines on the chart, means frictionally drivably connecting the post and the disc, a timing member on the disc engageable with the timing edge on the chart to prevent rotation of the chart on the disc beyond a predetermined time position, reference means on the panel cooperating with the graduations on the disc to indicate the time position of the disc and the chart, and means to turn the disc on the post to set the chart.

GEORGE E. LINDEMANN.